US012504322B2

(12) United States Patent
Semakula

(10) Patent No.: US 12,504,322 B2
(45) Date of Patent: Dec. 23, 2025

(54) REMOVABLE PHOTO DIODE CASE

(71) Applicant: Samuel A. Semakula, Bowie, MD (US)

(72) Inventor: Samuel A. Semakula, Bowie, MD (US)

(73) Assignee: United States of America, Dept. of the Navy, Washington, DC (US)

( * ) Notice: Subject to any disclaimer, the term of this patent is extended or adjusted under 35 U.S.C. 154(b) by 152 days.

(21) Appl. No.: 18/522,388

(22) Filed: Nov. 29, 2023

(65) Prior Publication Data

US 2025/0172431 A1     May 29, 2025

(51) Int. Cl.
*G01J 1/02*     (2006.01)
*F41H 13/00*    (2006.01)

(52) U.S. Cl.
CPC ........ *G01J 1/0271* (2013.01); *F41H 13/0062* (2013.01)

(58) Field of Classification Search
CPC .................. G01J 1/0271; G01J 1/4257; G01J 2003/1213; G01J 3/0291; G01J 2001/0285; G02B 2006/4297; H01S 5/06825; F41H 13/0062
See application file for complete search history.

(56) References Cited

U.S. PATENT DOCUMENTS

| | | | | |
|---|---|---|---|---|
| 6,141,829 A * | 11/2000 | Boyer | ....................... | E05D 7/06 16/382 |
| 2009/0140656 A1* | 6/2009 | Kohashikawa | ........ | H05B 45/40 315/151 |
| 2010/0265573 A1* | 10/2010 | Nolte | ................. | G02B 21/0024 359/368 |
| 2011/0102790 A1* | 5/2011 | Haught | .................. | G01N 21/31 356/319 |
| 2011/0260034 A1* | 10/2011 | Sasaki | ................... | G01J 1/4228 250/206 |
| 2017/0370778 A1* | 12/2017 | Au | ......... | G01J 3/0208 |
| 2019/0331595 A1* | 10/2019 | Matsuo | .............. | G01N 21/3504 |
| 2021/0063238 A1* | 3/2021 | Palumbo | ................ | G02B 5/003 |
| 2022/0071361 A1* | 3/2022 | Ernst | ...................... | A45C 13/02 |
| 2023/0228622 A1* | 7/2023 | Zinoviev | .............. | G01J 1/4257 250/239 |
| 2024/0072504 A1* | 2/2024 | Brown | ............... | G02B 27/0988 |

FOREIGN PATENT DOCUMENTS

| | | | | |
|---|---|---|---|---|
| DE | 102004035010 A1 * | 2/2006 | ............... | G01V 8/12 |
| EP | 4194908 A1 * | 6/2023 | ........... | G02B 27/108 |
| JP | S6148271 A * | 3/1986 | ............. | H01L 27/14 |
| JP | 7192583 B2 * | 12/2022 | ............. | G01N 21/01 |
| KR | 20150020281 A * | 2/2015 | ................ | G01J 1/04 |

\* cited by examiner

*Primary Examiner* — Jennifer D Bennett
*Assistant Examiner* — Erin R Garber

(57) ABSTRACT

A safety apparatus that includes a case, a diode sensor secured within the case, and a fastener for removably securing the case to a laser safety clipper ring.

19 Claims, 12 Drawing Sheets

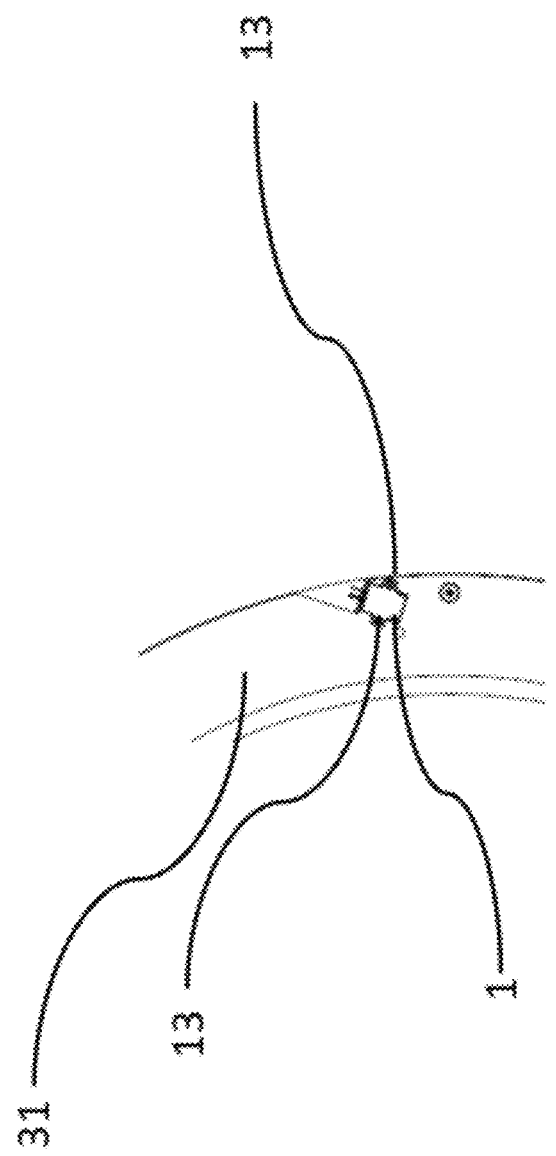

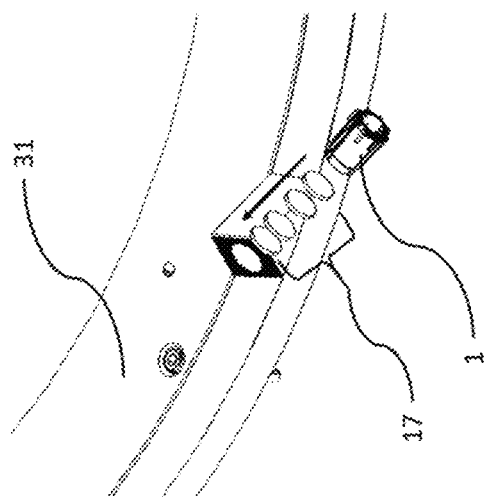
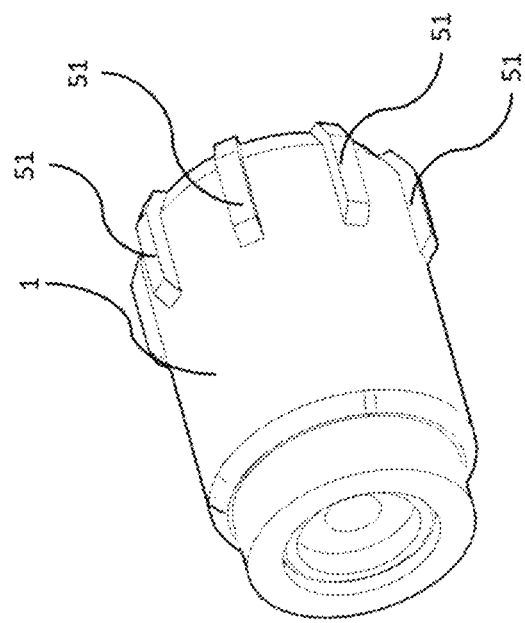
FIG. 5

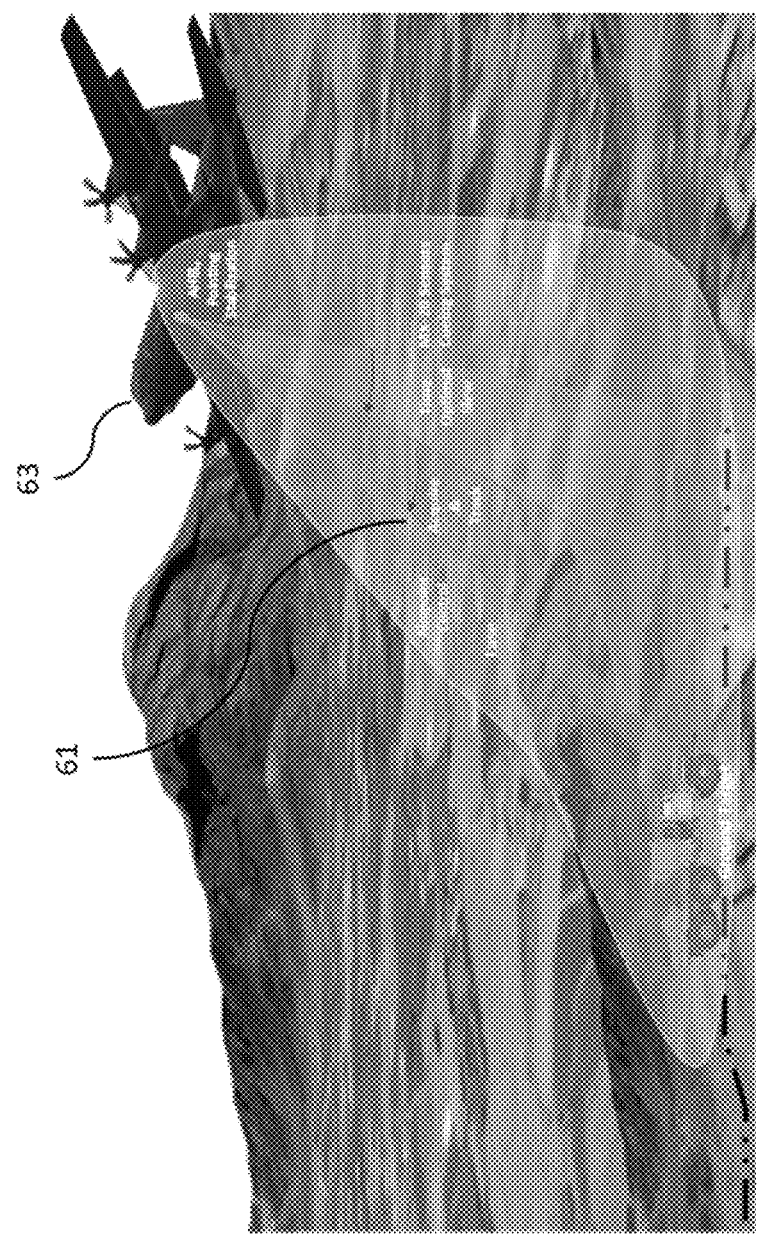

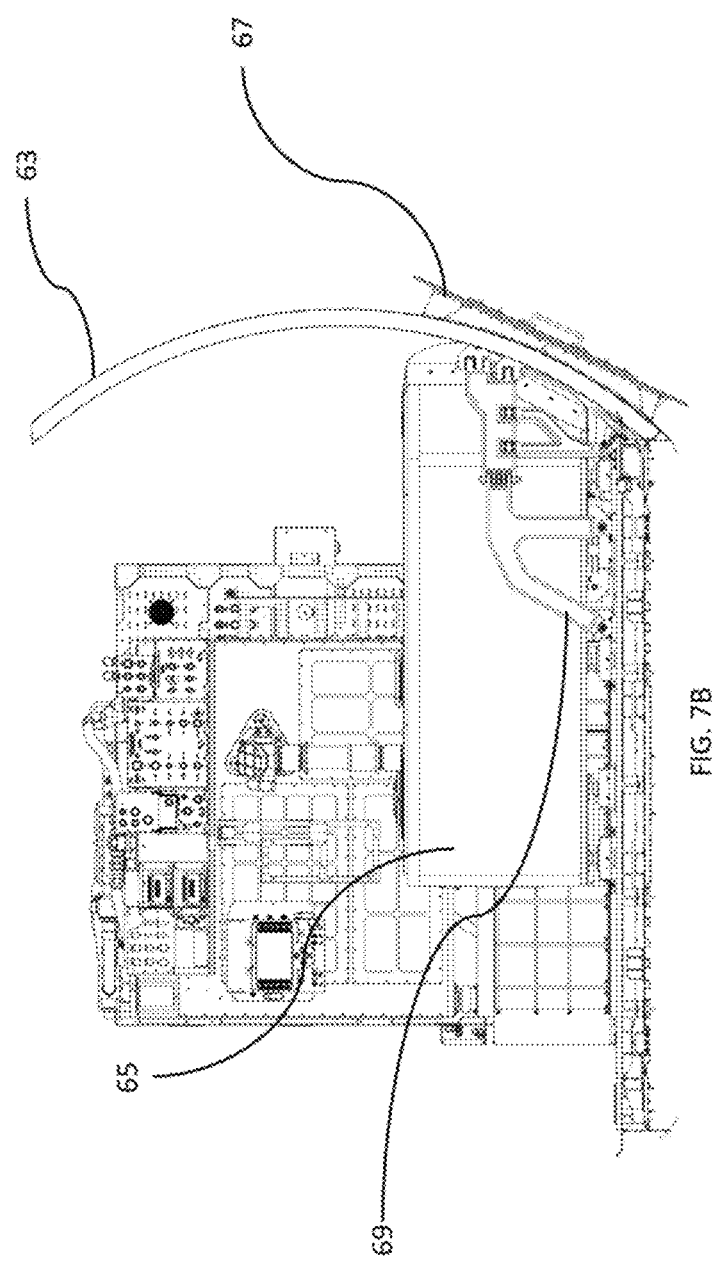

REMOVABLE PHOTO DIODE CASE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to a laser safety device. In particular, a clipper safety ring.

SUMMARY

The present disclosure relates, in various embodiments, to a critical safety component of all High Energy Laser Weapon Systems (HELWS) is a Hardwire Abort System (HWAS) which ensures that the HELWS beam is passing through the intended area of the final aperture. The key component in HELWS is the Safety Clipper Ring assembly. This assembly includes two beam dumps (concentric rings that are lap bolted together), a knife edge (this is the reflective/optical component that reflects incident laser energy onto the sensor) and the Photo Sensor Diode. Upon detection of HEL energy not passing through the intended aperture, the HEL firing signal is aborted, and the Laser Energy is halted. This ensures that the HEL does not continue to lase unintended targets.

Both ring beam dumps are machined on opposing sides so that when bolted together, they form cavity pockets that act as Lambertian scatterers. The top Ring dump provides pathways or tunnels that allow scattered laser energy to pass to the Photo Diode Sensor. The Safety Clipper Ring assembly also includes a highly reflective knife edge clipper which defines the clear aperture limit, such that any HEL light that strikes this is directed into the beam dump cavities or directly into the series of Photo Diode sensors. The purpose of these Photo Diode sensor is to detect scattered laser energy and send a signal to the HWAS controller. This Photo Diode case allows for the Diode to be inline of the energy pathway.

The Photo Diodes are selected to have fast response and high sensitivity to the HEL wavelength, but due to variations between individual detectors, it is typically necessary to add neutral density (ND) filters and diffusers to ensure uniform illumination of the detector face while not risking damage. These ND filters and diffusers must be held firmly in place and not allowed to move relative to each other as this could cause surface damage or bulk damage (i.e., cracking) of the components.

There have been a few iterations of Diode Sensor Cases. However, these designs did not allow for completely containing the filter components and did not eliminate the potential for small parts to fall, creating FOD. Given that this Clipper Ring will be used in an area with moving parts, it is particularly important to prevent the possibility debris and loose parts. This Diode Case solves this issue.

Disclosed herein is a safety apparatus comprising: a case, a diode sensor secured within the case, and a fastener for removably securing the case to a laser safety clipper ring. In some embodiments, the apparatus further comprises a door hingeably attached to the case, and an aperture within the door, wherein the door may be opened and closed to receive and secure the at least one removable filter. In some embodiments, the apparatus includes the laser safety clipper ring, wherein a plurality of cases are removably secured to the clipper ring such that the cases are aligned to ensure that a laser light passes through a plurality of cavities corresponding to the plurality of cases. In some embodiments, the door is hingeably attached with a press-fit pin. In some embodiments, the clipper ring further includes a first ring beam dump secured to a second ring beam dump forming the plurality of cavities. In some embodiments, the first and second ring beam dump provides a pathway that allows scattered laser energy to pass to the photo diode sensor. In some embodiments, each of the ring beam dumps further comprises a reflective knife edge defining an aperture limit, wherein each of the knife edges form a lambertian scatterer, such that any laser light that strikes the knife edge is directed into the beam dump cavities or directly into the diode sensors. In some embodiments, when a diode sensor senses light, a controller terminates the operation of the laser. In some embodiments, the pathway is in line with the photo diode sensor. In some embodiments, the diode sensors are selected to be responsive a wavelength of a corresponding laser. In some embodiments, when filters are necessary due to variations between diode sensors, filters are selected to ensure uniform illumination of the diode sensor while limiting the risk of damage. In some embodiments, the fastener is at least one captive screw. In some embodiments, the fastener is a thread around the case which corresponds to a thread in an opening in the laser safety clipper ring. In some embodiments, the case is manufactured from aluminum. In some embodiments, the at least one removable filter is secured between the case and the laser safety clipper ring. In some embodiments, the fastener is at least one captive screw. In some embodiments, the fastener is a thread around the case which corresponds to a thread in an opening in the laser safety clipper ring. In some embodiments, the case further comprises a detent allowing the door to snap into a closed position. In some embodiments, the door further comprises a detent allowing the door to snap into a closed position.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 3 shows a portion of the clipper ring with a photo diode assembly;

FIG. 5 shows an exploded version of another embodiment of the photo diode assembly;

FIG. 6 shows an application of the clipper ring;

FIG. 7A-B show a cutaway view of the aircraft fuselage with a laser mounted;

and

Figure 8:
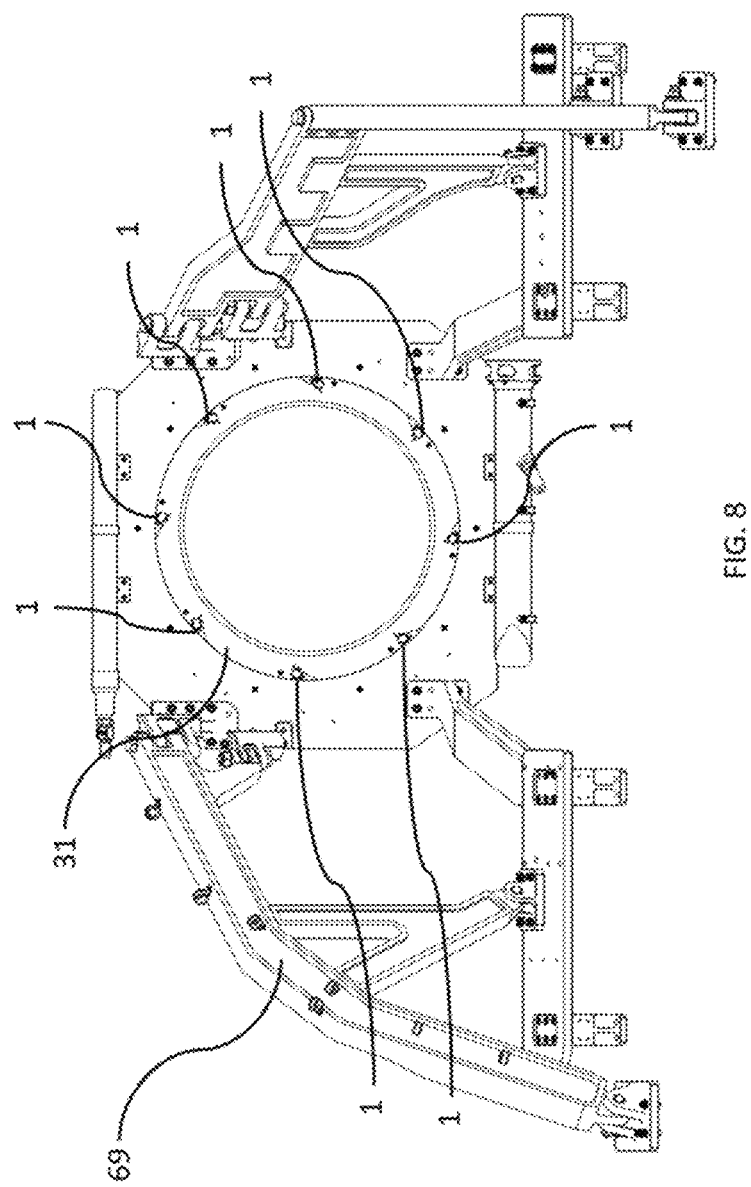

FIG. 8 is a front view of the clipper ring with a plurality of removable photo sensor diodes mounted on isolating mount.

DETAILED DESCRIPTION

Figure 1A:
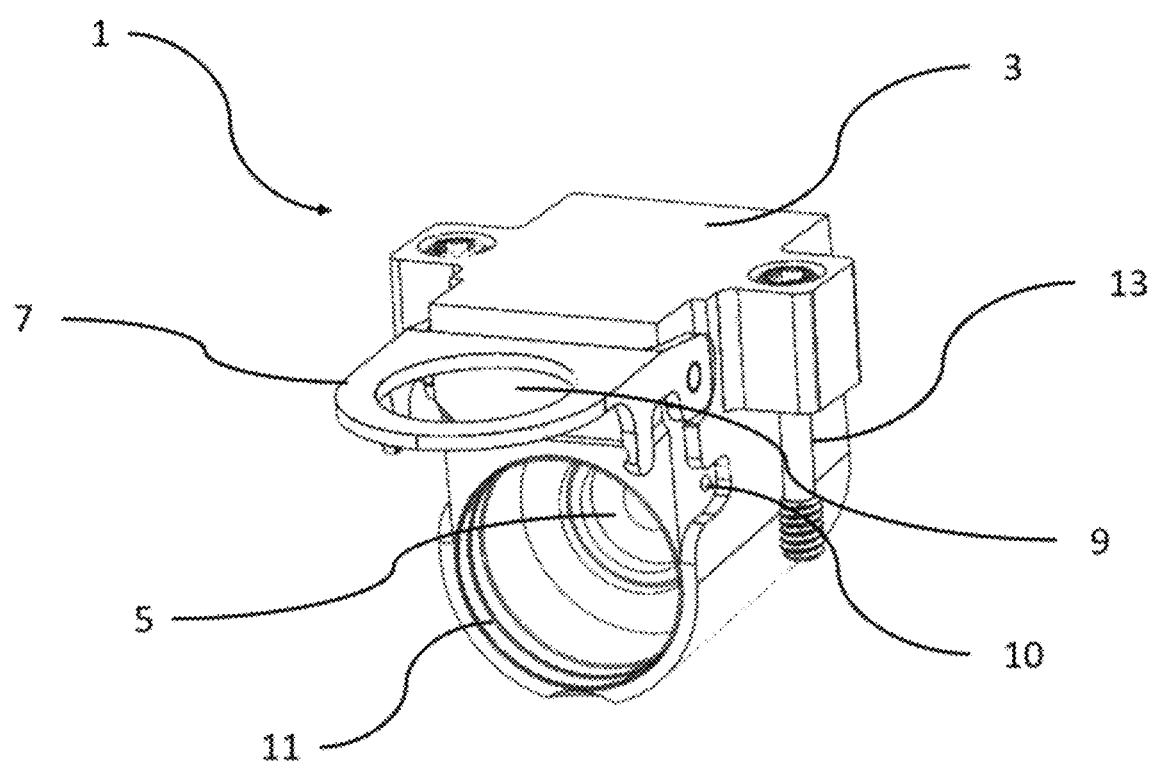
FIG. 1A-C shows a photo diode assembly.
Figure 1B:
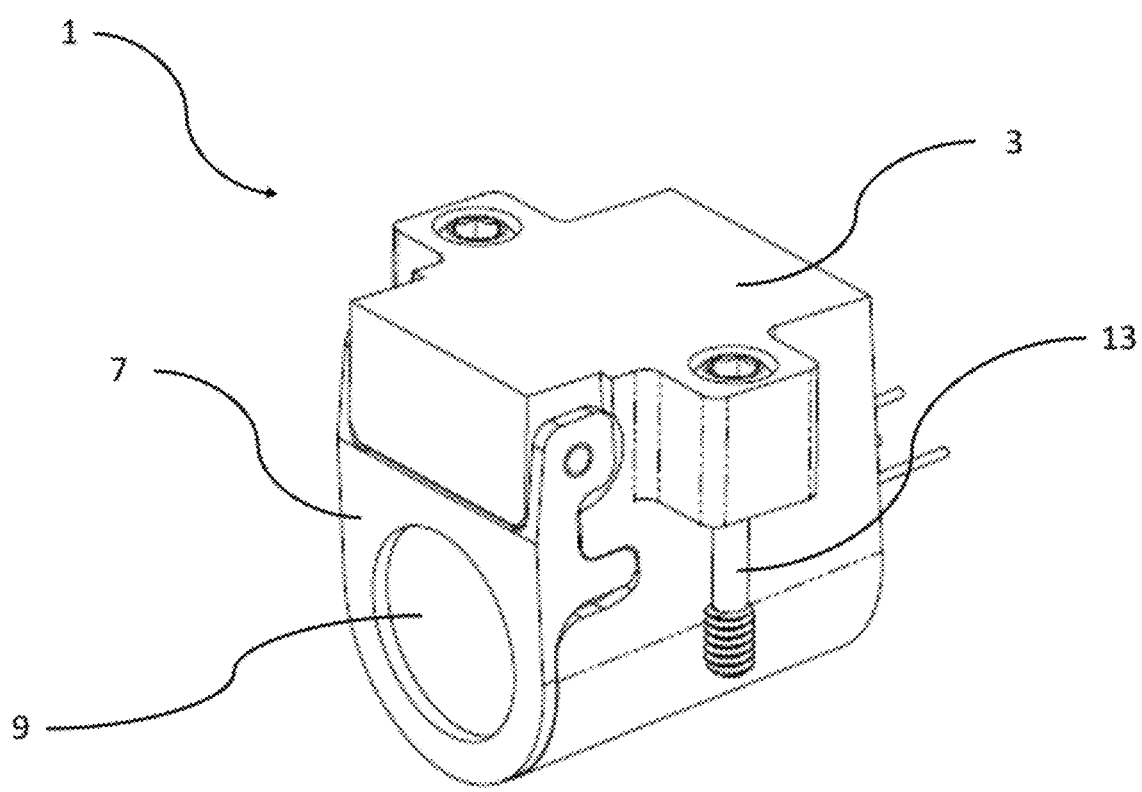
Figure 1C:
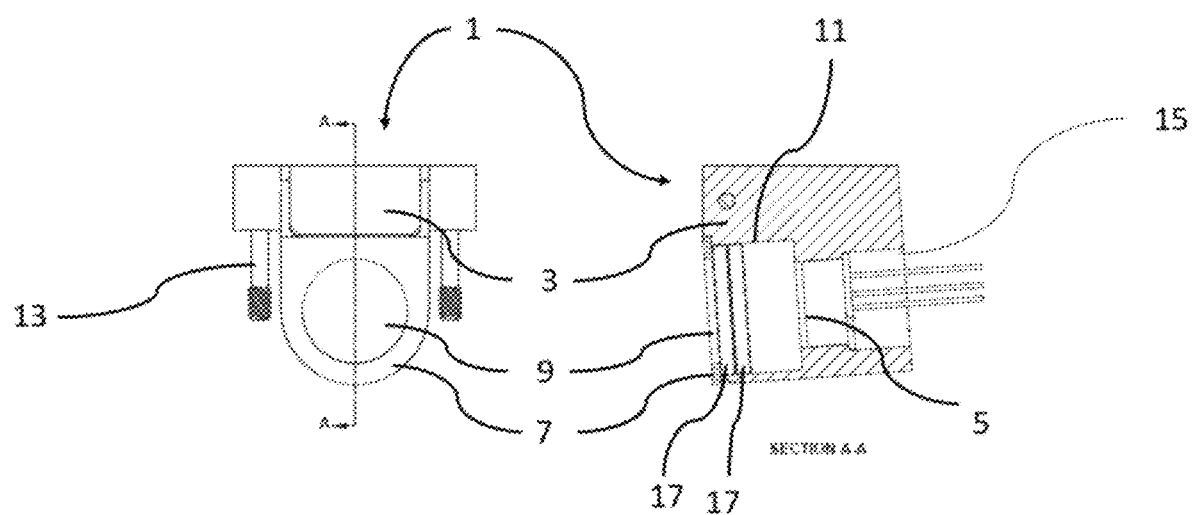
Figure 2:
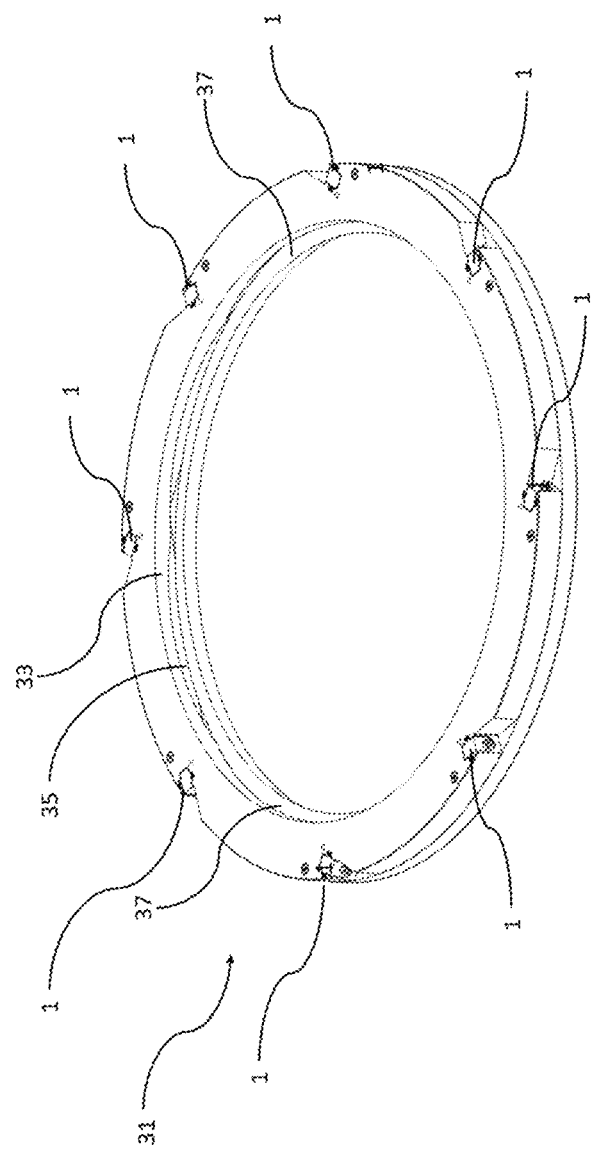
FIG. 2 shows a plurality of photo diode assemblies mounted on a clipper ring.

FIGS. 1A-C shows a photo diode assembly 1. The photo diode assembly 1 includes a case 3, a diode sensor 5, a door 7, an aperture 9 within the door, at a filter recess 11, and a pair of captive screws 13. As shown, a diode sensor 5 is secured in the case 3. The case 3 may be manufactured from an aluminum alloy such as (AL 5052-T4). The case 3 includes an opening 15 on the opposite side of the door 9 to allow the placement diode sensor 5 and the necessary electronic connections needed to operate the sensor. The diode sensor 5 is selected to correspond to the wavelength of the laser. The opening 15 allows for easy assembly of the photo diode case. Further, the door 7 includes an aperture 9 which allows optical energy that is reflected from the beam dumps 33 to pass unobstructed through the filters 17 to the diode sensor 5. The door 7 is hingeably attached to the case 3 to allow access to the filter recess 11. In some embodiments, the door 7 is hingeably attached with a press-fit pin. The door 7 can be opened (As shown in FIG. 1) or closed (As shown in FIG. 2), and allows for a various combination of spectral and/or neutral density filters to be inserted in the filter recess 11 to tune the response of the photo diode assembly 1. If fewer filters than the allotted space are needed, then blank optical elements are added to fill the case 3 which will ensure the positive pressure on all the elements contained in the case. The inclusion of the door 7 allows rapid replacement and inspection of the filters and a visual inspection of the diode sensor 5. Due to the variation in quality of the diode sensors 5, it is often necessary to select filters 17 ensure uniform illumination of the diode sensor 5. These filters 17 may also limit the risk of damage to the diode sensor 5. In some embodiments, the case 3 is manufactured from aluminum. In some embodiments, the case 3 further includes a detent 10 allowing the door 7 to snap closed. In other embodiments, the detent 10 is included in the door.

FIG. 2 shows a plurality of photo diode assemblies 1 mounted on a clipper ring 31. As seen in this embodiment, the clipper ring comprises a first and second ring beam dump 33, 35, fastened together to form at least one cavity 37 corresponding to the plurality of photo sensor diode assemblies 1. Further, wherein the first and second ring beam dump 33, 35 provides a pathway (not shown) that allows scattered laser energy to pass to the photo diode sensor assembly 1. In some embodiments, the pathway is in line with the photo sensor diode assembly 1. Further, each of the ring beam dumps 33, 35 includes a reflective knife edge defining an aperture limit, wherein each of the knife edges form a lambertian scatterer, such that any laser light that strikes the knife edge is directed into the beam dump cavities 37 or directly into the photo diode sensors 1 such that when a diode sensor senses light, a controller terminates the operation of the laser.

FIG. 3 shows a portion of the clipper ring 31 with a photo diode assembly 1. In the embodiment shown, the photo diode assembly is mounted to the clipper ring 31 with the captive screws 13.

Figure 4A:
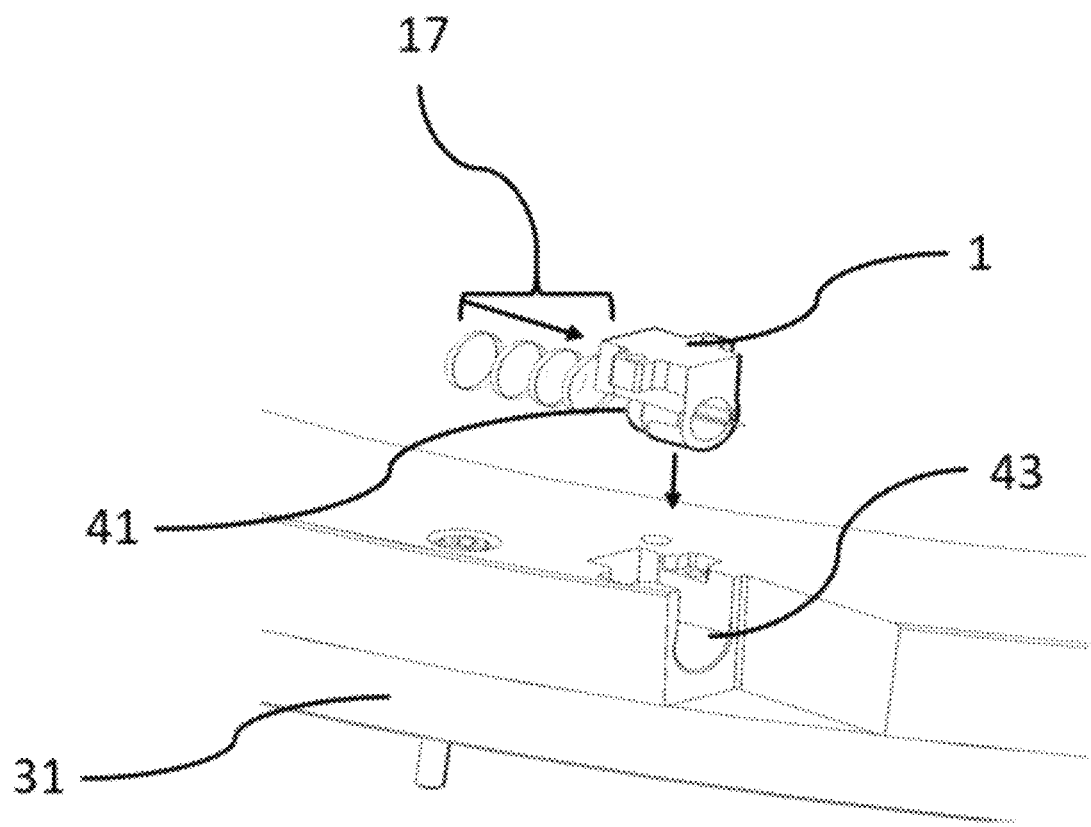
FIG. 4A-B shows an exploded view of another embodiment of the photo diode assembly.
Figure 4B:
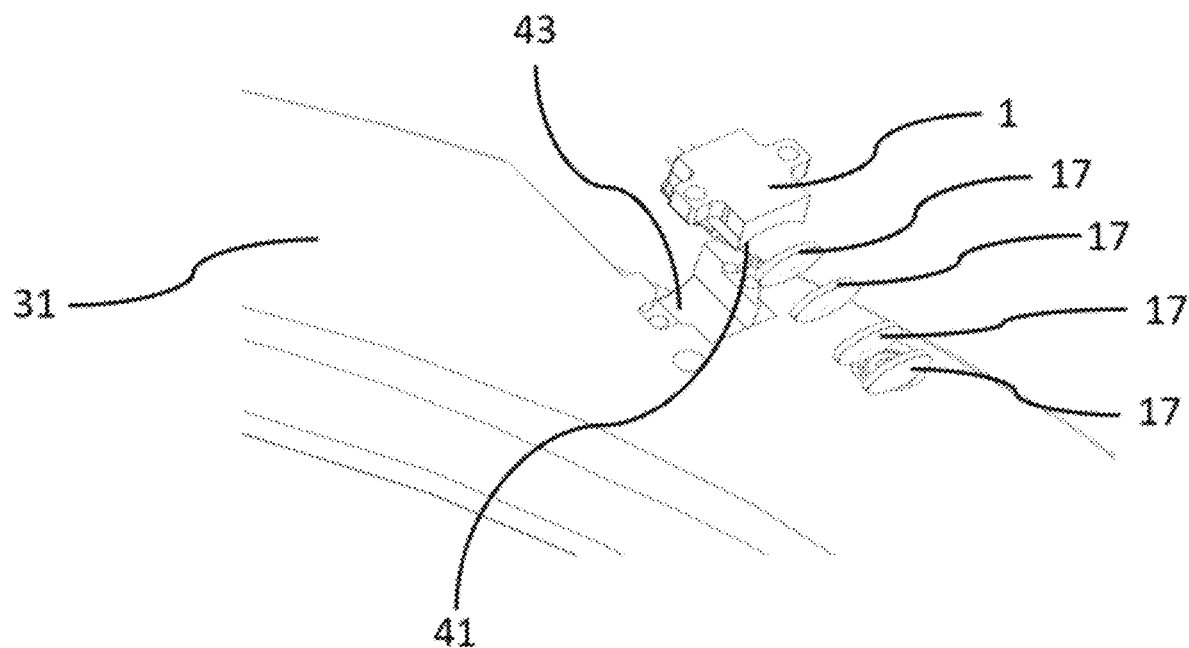

FIGS. 4A-B shows an exploded view of another embodiment of the photo diode assembly 1. In this embodiment, the photo diode assembly includes a recess 41 that accommodates at least one filter 17. In this embodiment, the filters 17 are held in place between the recess 41 and a corresponding recess 43 in the clipper ring 31.

FIG. 5 shows an exploded version of another embodiment of the photo diode assembly 1. In this embodiment, the photo diode assembly 1 includes a threaded case (not shown) which may be fastened to a corresponding thread in the clipper ring 31 by an operator without tools by screwing in the case 3 using ridges 51 for traction. In this embodiment, the filters 17 are secured between the photo sensor assembly 1 and the clipper ring 31.

FIG. 6 shows an application of the clipper ring 31. In this instance, a laser 61 is mounted on a platform 63. In this instance, the platform 61 is an aircraft but the deployment of the laser is not limited to aircraft and may include any type of vehicle including but not limited to ships, automobiles, unmanned aerial vehicles (UAVs). The clipper ring is used to prevent the laser from illuminating an unintended target such as a component of the aircraft 61 such as a wing, an engine or the fuselage, an object outside of the intended target area, or the internal mechanisms of the laser.

Figure 7A:
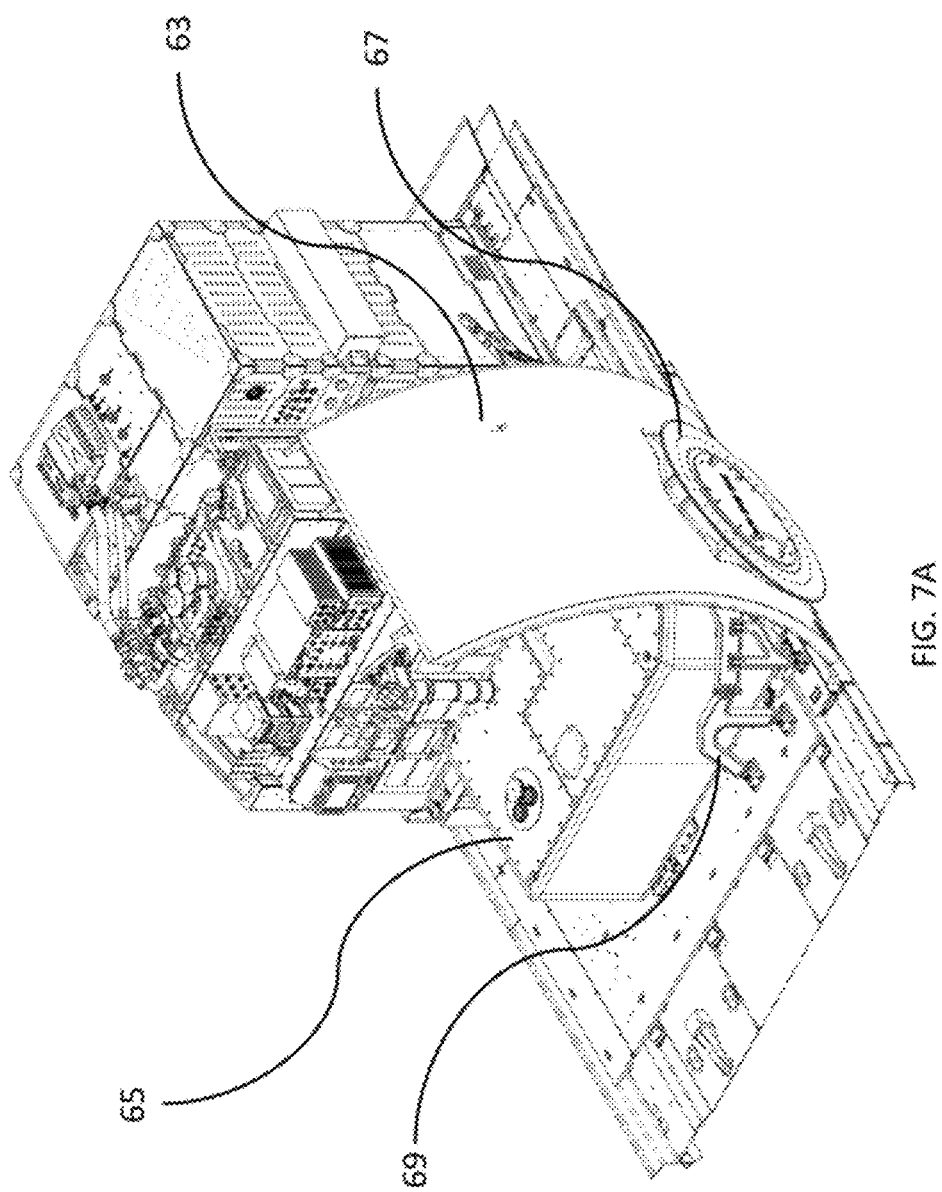

FIGS. 7A-B show a cutaway view of the aircraft fuselage 63 with a laser 65 mounted. As shown, the laser 65 is mounted in the aircraft fuselage so that it can lase through gun port 67. The laser 65 is aligned to lase through gun port 67 in fuselage 63. The clipper ring (not shown in these views) is mounted on isolating mount 69.

FIG. 8 is a front view of the clipper ring 31 with a plurality of removable photo sensor diodes mounted on isolating mount 69.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An apparatus comprising: a case; a diode sensor secured within the case; and a fastener for removably securing the case to a laser safety clipper ring beam dump.

2. The apparatus of claim 1 further comprising:
a door hingeably attached to the case; and
an aperture within the door;
wherein the door is opened and closed to receive and secure an at least one removable filter.

3. The apparatus of claim 2 wherein the door is hingeably attached with a press-fit pin.

4. The apparatus of claim 2 wherein the case further comprises a detent allowing the door to snap into a closed position.

5. The apparatus of claim 2 wherein the door further comprises a detent allowing the door to snap into a closed position.

6. The apparatus of claim 1 further comprising: the laser safety clipper ring beam dump; wherein a plurality of cases are removably secured to the clipper ring beam dump such that the plurality cases are aligned to ensure that a laser light passes through a plurality of cavities corresponding to the plurality of cases.

7. The apparatus of claim 6 wherein the laser safety clipper ring beam dump further comprises a first ring beam dump secured to a second ring beam dump forming the plurality of cavities.

8. The apparatus of claim 7 wherein the first and second ring beam dump provides a pathway that allows scattered laser energy to pass to the diode sensor.

9. The apparatus of claim 8 wherein each of the ring beam dumps further comprises a reflective knife edge defining an aperture limit, wherein each of the knife edges form a lambertian scatterer, such that any laser light that strikes the knife edge is directed into the beam dump cavities or directly into the diode sensors.

10. The apparatus of claim 9 further comprising:
when the diode sensor senses light, a controller terminates the operation of the laser.

11. The apparatus of claim 8 wherein the pathway is in line with the diode sensor.

12. The apparatus of claim 1 wherein a plurality of diode sensors are selected to be responsive to a wavelength of a corresponding laser.

13. The apparatus of claim 12 wherein, when filters are necessary due to variations between diode sensors, filters are selected to ensure uniform illumination of the diode sensor while limiting a risk of damage.

14. The apparatus of claim 1 wherein the fastener is at least one captive screw.

15. The apparatus of claim 1 wherein the fastener is a thread around the case which corresponds to a thread in an opening in the laser safety clipper ring beam dump.

16. The apparatus of claim 1 wherein the case is manufactured from aluminum.

17. The apparatus of claim 1 wherein the at least one removable filter is secured between the case and the laser safety clipper ring beam dump.

18. The apparatus of claim 17 wherein the fastener is at least one captive screw.

19. The apparatus of claim 17 wherein the fastener is a thread around the case which corresponds to a thread in an opening in the laser safety clipper ring.

* * * * *